(12) United States Patent
Sutorik et al.

(10) Patent No.: US 7,220,398 B2
(45) Date of Patent: May 22, 2007

(54) MIXED-METAL OXIDE PARTICLES BY LIQUID FEED FLAME SPRAY PYROLYSIS OF OXIDE PRECURSORS IN OXYGENATED SOLVENTS

(75) Inventors: Anthony C. Sutorik, Saline, MI (US); Richard M. Laine, Ann Arbor, MI (US); Julien Marchal, Ann Arbor, MI (US); Tyrone Johns, St. Albans, NY (US); Thomas Hinklin, Ann Arbor, MI (US)

(73) Assignee: TAL Materials & The Regents of the University of Michigan, Ann Arbor, MI (US)

( * ) Notice: Subject to any disclaimer, the term of this patent is extended or adjusted under 35 U.S.C. 154(b) by 187 days.

(21) Appl. No.: 10/503,454

(22) PCT Filed: Feb. 19, 2003
(Under 37 CFR 1.47)

(86) PCT No.: PCT/US03/04849

§ 371 (c)(1),
(2), (4) Date: Jan. 31, 2005

(87) PCT Pub. No.: WO03/070640

PCT Pub. Date: Aug. 28, 2003

(65) Prior Publication Data

US 2005/0227864 A1    Oct. 13, 2005

Related U.S. Application Data

(60) Provisional application No. 60/358,496, filed on Feb. 19, 2002.

(51) Int. Cl.
C01G 1/02       (2006.01)
C01G 23/04      (2006.01)

(52) U.S. Cl. .............. 423/593.1; 423/71; 423/115; 423/598; 423/600

(58) Field of Classification Search ............ 423/71, 423/115, 593.1, 598, 600
See application file for complete search history.

(56) References Cited

U.S. PATENT DOCUMENTS

| 2,239,551 | A | | 4/1941 | Dalton et al. | |
|---|---|---|---|---|---|
| 2,272,342 | A | | 2/1942 | Hyde | |
| 2,326,059 | A | | 8/1943 | Nordberg | |
| 4,588,575 | A | * | 5/1986 | David | 423/594.1 |
| 5,169,969 | A | * | 12/1992 | Sherif | 556/28 |
| 5,358,695 | A | * | 10/1994 | Helble et al. | 423/263 |
| 5,368,834 | A | | 11/1994 | Kulwicki et al. | |
| 5,378,665 | A | * | 1/1995 | Chen et al. | 501/95.1 |
| 5,614,596 | A | | 3/1997 | Laine et al. | |
| 5,652,021 | A | | 7/1997 | Hunt et al. | |
| 5,728,362 | A | * | 3/1998 | Greuter et al. | 423/594.7 |
| 5,744,118 | A | | 4/1998 | Imamura et al. | |
| 5,858,465 | A | | 1/1999 | Hunt et al. | |
| 5,863,604 | A | | 1/1999 | Hunt et al. | |
| 5,958,361 | A | * | 9/1999 | Laine et al. | 423/610 |
| 5,958,367 | A | | 9/1999 | Ying et al. | |
| 6,013,318 | A | | 1/2000 | Hunt et al. | |
| 6,328,944 | B1 | | 12/2001 | Mangold et al. | |
| 6,613,300 | B2 | | 9/2003 | Mangold et al. | |
| 6,680,041 | B1 | * | 1/2004 | Kumar et al. | 423/605 |
| 6,685,762 | B1 | | 2/2004 | Brewster et al. | |
| 6,762,147 | B2 | * | 7/2004 | Morikawa et al. | 502/242 |
| 2002/0007650 | A1 | | 1/2002 | Hattori et al. | |
| 2002/0035950 | A1 | | 3/2002 | Mangold et al. | |
| 2002/0177311 | A1 | | 11/2002 | Schumacher et al. | |
| 2003/0124043 | A1 | | 7/2003 | Yadav et al. | |

FOREIGN PATENT DOCUMENTS

CH              265192       11/1949
WO        WO 00/38282        6/2000

OTHER PUBLICATIONS

Mizoguchi et al., "Film Synthesis of $Y_3Al_5O_{12}$ and $Y_3Fe_5O_{12}$ by the Spray Inductively Coupled Plasma Technique," J. Am. Cer. Soc., 84, 651-3 (2001).
Kapron et al., "Radiation Losses in Glass Optical Waveguides," Appl. Phys. Lett. 17, 423-5 (1970).
MacChesney et al., "Preparation of Low-Loss Optical Fibers Using Simultaneous Vapor Deposition and Fusion," Proc. 10th, Internat. Congresss on Glass, Kyoto, Japan; 640-4 (1974).
Shoji et al., "Optical Properties and Laser Characteristics of Highly $Nd^{3+}$ Doped $Y_3Al_5O_{12}$ Ceramics," Appl. Phys. Lett. 77, 939-41 (2000).
Lu et al., "Optical Properties and Highly Efficient Laser Oscillation of Nd:YAG Ceramics," Appl. Phys. B 71 469-73 (2000).
Nyman eet al., "Comparison of Solid-State and Spray-Pyrolysis Synthesis of Yttrium Aluminate Powders," J. Am. Cer. Soc. 80[5] 1231-38 (1997).
Baranwal et al., "Flame Spray Pyrolysis of Precursors as a Route to Nanomullite Powder . . . ," J. Am. Cer. Soc. 84[5], 951-61 (2001).
Johnson et al., "Crystallization Kinetics of Yttrium Aluminum Garnet," J. Matr. Res., 16[6], 1795-1805 (2001).
English Abstract of Swedish Patent No. 265,192.

* cited by examiner

*Primary Examiner*—H. Thi Le
(74) *Attorney, Agent, or Firm*—Gifford, Krass, Groh, Sprinkle, Anderson & Citkowski, P.C.

(57) ABSTRACT

Liquid feed flame spray pyrolysis of solutions of a metal oxide precursor which is an alkoxide or $C_{1-6}$ carboxylate and at least one second metal oxide precursor and/or second metal compound dissolved in oxygenated solvent by combustion with oxygen lead to the formation of sub-micron mixed-metal oxide powders not accessible by other processes or by the pyrolysis of metal chlorides or nitrates. The powders have numerous uses in advanced materials applications including particulate solid state lasers, advanced ceramic materials, and as catalysts in organic synthesis and automobile exhaust systems.

17 Claims, No Drawings

MIXED-METAL OXIDE PARTICLES BY LIQUID FEED FLAME SPRAY PYROLYSIS OF OXIDE PRECURSORS IN OXYGENATED SOLVENTS

CROSS-REFERENCE TO RELATED APPLICATION

This application claims the benefit of U.S. provisional application Ser. No. 60/358,496, filed Feb. 19, 2002.

BACKGROUND OF THE INVENTION

1. Field of the Invention

The field of the present invention is related to liquid-feed flame spray pyrolysis production of ultrafine and nano mixed-metal oxide particles and coatings thereof, and selected metalloorganic precursors and solvent systems for this process. By suitable combination of precursors, unusual phases can be produced that offer opportunities to serve as novel catalysts, photonic materials, sensing materials, fuel cell materials, conducting materials, transparent ceramics, etc.

2. Background Art

The literature describes numerous methods of preparing ultrafine and nanosized metal oxide powders and metal oxide coatings using chemical compounds as precursors. In general, these methods can be broadly classified as liquid or gas phase processing. Liquid phase approaches include sol-gel, precipitation, hydrothermal, and electrochemical processing. Gas phase approaches include spray pyrolysis, metal evaporation/oxidation, plasma spray, flame spray pyrolysis, laser ablation, ion implantation, physical vapor deposition ("PVD"), or chemical vapor deposition ("CVD") methods. Some methods combine processes, e.g. spray-freeze drying.

Liquid phase approaches usually require large volumes of liquid that must be removed/eliminated during coating, or to produce unaggregated nanoparticles. In the latter case, the solvent must then be laboriously separated from the nanoparticles. Both situations lead to production limitations and commonly to non-crystalline products that must then be calcined to crystallize the desired phase, and then sintered if dense coatings are desired. Thus, these processes tend to be multistep, require solvent recycle and introduce waste disposal issues that make them energy, equipment and time intensive. Hence they are less practical than gas phase methods.

Of the gas phase processing methods, CVD, spray pyrolysis, plasma spray, laser ablation, and flame spray pyrolysis ("FSP"), are used commercially to make ultrafine (100–500 nm average particle size "APS") and nano (<100 nm APS) metal oxide powders and coatings.

Metal evaporation methods can be used to form metal coatings or powders that can be subsequently oxidized to metal oxides. Metal evaporation powder processing provides a variety of high purity, single-metal oxide nanopowders but offers limited opportunity for mixed-metal oxide powder or coating production because miscible metal alloy precursors are often difficult or impossible to produce.

Spray pyrolysis has been used to produce many types of single-metal oxide powders and some mixed-metal oxide powders and coatings. The process involves aerosolization of precursors dissolved in a wide variety of solvents. The initially formed aerosol droplets lose solvent by evaporation in a hot-walled reactor, and depending on the residence time in the reactor and the thermal environment, spherical powders are produced that are either hollow, porous and amorphous, or solids. Both ultrafine and nanosized powders can be formed, however the need for a hot-walled reactor often leads to particle aggregation unless very low number densities are used, limiting the potential for large scale production. Coatings made by this process with plasma assists are known, but the process has not been generally adopted except for making thermal barrier coatings. Furthermore, the literature reports that efforts to produce mixed-metal oxide powders rarely result in compositionally homogeneous materials with controlled phase or if successful, do not provide nanopowders. The products are often amorphous materials that require further heat treatment to obtain the desired phase. These same negative attributes make producing coatings very difficult.

PVD and laser ablation methods use high-energy electron or laser beams to ablate materials from targets of the composition desired in the coating or powders to be formed. These processes often require controlled atmospheres and because of the high energies involved are energy and equipment intensive. Furthermore, the targets themselves can require special processing to achieve compositions that give the correct stoichiometry in the coatings or powders produced which may not be the initial composition of the target.

Chemical vapor deposition takes many forms. The basic concept is one in which a volatile organometallic or metalloorganic compound is evaporated by heating, and entrained in a gas flow, or by vacuum sublimation. The material is then decomposed using a variety of processes that can involve heat, plasma, light or a combinations of these to produce powders in the gas phase or coatings on substrates. For coatings on substrates, the materials must decompose at, or near the substrate and then adhere which typically means that the substrate must be heated using a second heat source. Efforts to produce mixed-metal oxides are known and successful but again control of stoichiometry and phase are difficult because mixing in the gas phase, and simultaneous and uniform decomposition is frequently very difficult to obtain. Furthermore, the processes almost always involve closed wall reactors where the total pressures as well as the pressures and concentrations of the individual precursors must be closely controlled.

FSP is the primary commercial method of making kiloton quantities of ultrafine (titania for the paint industry) and nanopowders (fumed silica and carbon black). Carbon black is produced via numerous processes in a reducing flame. Ultrafine and nano-$TiO_2$ and $SiO_2$ (fumed) are produced from volatile $TiCl_4$ or $SiCl_4$ in $H_2/O_2$ combustion flames. The process involves flame hydrolysis. Combustion (700–1500° C.) generates nanopowders as ceramic soot, and chlorine and HCl as byproducts. Although, these byproducts are easily removed. they are toxic, corrosive pollutants, as are the starting metal chlorides. Thus, the commercial processes are highly equipment and energy intensive simply because of the pollution and corrosion control equipment. The resulting powders (e.g. titania) are identical to those produced by metal evaporation, or FSP of metal alkoxides but offer lower cost because the process is mature and scaled, although the products are frequently contaminated by chlorine.

Despite these drawbacks, the formation of coatings and monoliths using FSP is well-known in the optical and photonics fields, especially for the manufacture of boules for pulling fibers for optical cables. The process was first reported in the early '70s but has been used to produce a variety of coatings. Flame spray coating generates nanoparticles for example of silica and/or germania under conditions where they stick to the surface of a perform, and thereafter sinter to the surface to form a defect free, dense and high purity coating. The process can be repeated sufficient numbers of times that the coatings eventually become thick enough to form monolithic materials that can then be used as boules for pulling optical fibers. The thickness of each coating layer is determined only by the number of traverses of the torch across the mandrel/substrate.

The coating material can be varied so that it has a graded index of refraction. For example, mixtures of $SiCl_4$ and $GeCl_4$ can be varied in the process to create slight decreases in refractive index at the exterior allowing graded indices of refraction in the fibers following pulling. This approach is three decades old. More recently, Skandan et al. and Choy et al. have independently reported making coatings with controlled porosity using a nearly identical approach in which the deposited particles are selectively sintered to the substrate to control pore size and density.

Unfortunately, as noted in review articles on metal chloride FSP the production of mixed-metal oxides is relatively undeveloped, disadvantages of which include difficulties in producing multicomponent materials, low production rates, and hazardous gaseous reactants and byproducts, in addition to formation of hard agglomerates in the gas phase, leading to difficulties in producing high-quality bulk materials.

Doped mixed-metal nanopowders have been prepared in counterflow $H_2/O_2$ diffusion flames employing chlorides or oxychlorides of Ti, Al, Si, Ge, and V. However, mullite powders prepared from $AlCl_3$ and $SiCl_4$ gave rise to particles of individual metal oxides or of a metal oxide coated with a second metal oxide. Laminar diffusion FSP with $H_2/O_2$ has been used to prepare particles which are solid solutions at low Si content, but have a silica coating at higher Si content. Aside from issues of toxicity, corrosion, and pollution, the metal chlorides must be quite volatile for successful FSP production of metal oxide particles, and thus this method is not suitable as a general method for mixed-metal oxide powders.

Hunt et al., in U.S. Pat. Nos. 5,652,021; 5,858,465; 5,863,604; and 6,013,318, describe the use of reagents which vaporize when the liquid organic solution is burned and the resulting vapors are deposited onto a substrate that is positioned so that it is in or just beyond the flame's end. However, Hunt et al.'s description of the process suggests that the reagent is not changed during the combustion process, but rather that homogeneous nucleation in the gas phase is avoided and adherence is obtained by flame heating of the substrate, i.e. the process is similar in this respect to CVD. The process can be run in an open atmosphere, and the coatings can form epitaxially and are dense. Examples using two different solvents, ethanol and toluene, are given and using two different precursors, metal acetylacetonates and 2-ethylhexanoates. However, in making yttria-stabilized zirconia (YSZ), toluene solutions of the 2-ethylhexanoate were required to produce good coatings.

SUMMARY OF THE INVENTION

The present invention is directed to the production of mixed-metal oxide powders of sub-micron size and coatings prepared therfrom, wherein the mixed-metal oxides are prepared by liquid feed flame spray pyrolysis of metal complexes of oxygen-containing ligands in an oxygenated solvent. The process allows production of novel mixed-metal oxide powders which have numerous uses.

DETAILED DESCRIPTION OF THE PREFERRED EMBODIMENT(S)

The process of the invention pertains to liquid feed flame spray pyrolysis of mixtures of metal oxide precursors as hereinafter defined, in a low viscosity, volatile oxygenated solvent. The process produces mixed-metal oxide powders with little tendency to form aggregates, and can be used to prepare coatings by impinging the particles onto a substrate. The process does not liberate toxic byproducts nor require environmentally or toxicologically suspect starting materials.

In selected embodiments, metal oxide precursor proportions are chosen such that phase segregation of at least one second phase which can form coincidentally a solid solution with a third phase on a primary phase or a doped crystalline primary phase is created.

In one aspect of the invention, metal oxide precursors are alkoxides or $C_{1-6}$ carboxylates of the metals employed, optionally containing further complexed oxygenated ligands, and optionally bearing metal-bound hydroxyl (hydroxide) ligands. The metal oxide precursors are soluble in volatile, low viscosity oxygenated solvents, which themselves may contribute complexing ligands, to form atomizable liquid feeds substantially free of solids, except as described for certain applications hereafter. In this aspect of the invention, the relative amounts of metal oxide precursors are selected such that phase segregation of at least one phase occurs such that a heterogenous particle is produced, at least one phase of which is a solid solution of at least two metal oxides or a doped crystalline phase. Preferably, phase segregation forms an incomplete (or nearly complete) core/shell structure with a substantially single metal oxide core and a mixed-metal oxide shell.

In a second aspect of the invention, novel metal carboxylates also bearing a metal bound hydroxyl group are employed as metal oxide precursors. These compounds have proven to be unexpectedly good metal oxide precursors.

In a third aspect of the invention, it has been surprisingly discovered that metal oxide precursors which are too insoluble in oxygenated solvents to be used as metal oxide precursors alone, can be solubilized by addition of metal carboxylates, in some cases forming mixed-metal complexes, and then used efficiently to prepare mixed-metal oxide particles.

Suitable metal alkoxides include those prepared in accordance with U.S. Pat. No. 5,958,361, WO 00/38282; and U.S. Pat. No. 5,614,596, herein incorporated by reference, including alumatranes and metalatranes. As indicated by the foregoing, such alkoxides are commercially available. Metalatranes such as alumatranes can be prepared directly from metal oxides or from the metal alkoxide.

Metal carboxylates are also available commercially, or can be prepared by customary synthetic methods. The carboxylates are generally carboxylates of carboxylic acids having from 1 to 6 carbon atoms, preferably 3 to 6 carbon atoms which may also contain further oxygen atoms in the form of aldehyde, keto, ether, or hydroxyl groups, i.e. methoxyacetic acid, and the like. Particularly useful metal carboxylates include those in which the metal is bonded to one or more hydroxide groups, e.g. $Y(OH)(O_2CCH_2XMe)_2$, where Me is methyl and X is O or $CH_2$ or CHMe. Use of such carboxylates in FSP is novel.

The metal oxide precursors are employed such that at least two different metals are present in the liquid feed to the flame spray pyrolysis. These two different metals may be introduced by dissolving two different metal oxide precursors as previously defined in a common solvent or solvent mixture, or in the third aspect of the invention, may be introduced by forming a solution of one metal oxide precursor and a second metal compound, for example but not by limitation, one which is of too limited solubility to act as a metal oxide source compound by itself. Examples include the use of aluminum propionate and yttrium propionate, both metal oxide precursors as defined herein, dissolved in ethanol, or yttrium propionate, a metal oxide precursor compound, and aluminum acetylacetonate, which by itself is too insoluble in ethanol to be useful. However, as shown later in the Examples, yttrium propionate complexes with aluminum acetylacetonate to produce a clear solution which, when used as the liquid feed, is useful to prepare mixed Y/Al oxides. The process of the invention requires at least one metal oxide precursor as previously defined. A second metal oxide in the mixed-metal oxide product may be supplied by a second (or further) metal oxide precursor, or by a compound of a second metal which, in the presence of the first metal oxide precursor, forms a solution in the oxygenated solvent. The second metal compound, however, should not be a chloride or oxychloride, otherwise toxic byproducts will be produced, and is preferably also not a metal nitrate. Metalloorganic compounds are preferred. Thus, the second metal compound may be a complex of an oxygenated ligand with the respective metal, although not an alkoxide or lower ($C_{1-6}$) carboxylate. Metal acetylacetonates and metal (higher) carboxylates are useful as the second metal compound.

In a further aspect of the invention, it has been surprisingly discovered that when mixed-metal oxide particles containing significant amounts of at least two metal oxides, and optionally further metal oxides, particularly as dopants, are desired, particle composition and morphology are strikingly different from particles prepared from a single metal oxide precursor but where a second metal oxide source constitutes a metal nitrate or metal chloride. Thus, in this additional aspect of the invention, particles are prepared by liquid feed FSP with metal oxide precursors in the absence of metal nitrates and metal chlorides.

The metal oxides useful in the mixed-metal oxides of the present invention include all metal oxides. In many cases, one or two metal oxides will predominate, for example, in mixed metal oxides where the predominate metal oxides are those of alumina, titania, silica, or zirconia, or in mixed-metal oxides where the predominate metal oxides are silica and titania, silica and zirconia, silica and alumina, alumina and titania, etc. These mixed-metal oxides may have oxides of transition and rare earth metals, i.e. the lanthanides and actinides, as further significant components, or as dopants. The term "metal oxide" as used herein includes semimetals such as geranium as well. Mixed-metal oxides where a predominant metal oxide is a transition or rare earth metal are also suitable.

A dopant metal as that term is used herein means a metal present in a small amount in a metal oxide crystalline phase, distributed within the crystal lattice, i.e., as the term is used in semiconductor technology, or in a non-crystalline phase, in an amount which does not itself phase segregate to form a separate phase. In crystal structures, the amount of a dopant may exceed the thermodynamic limit without phase segregation. If phase segregation does occur, minor amounts of the metal oxide which segregates may remain to form a dopant in one phase, whereas in the second phase, it may constitute a major component. In the present invention, all non-dopant metal oxides must be supplied in a form other than metal halides, oxyhalides, or nitrates. Only very small amounts of dopants, less than an amount which will cause phase segregation, may be supplied in these forms. For example, if a mixed aluminum and titanium oxide is to be doped with 0.001 mol percent praesodymium, the latter may be supplied, e.g., as a nitrate or chloride, although it is still preferable to supply Pr as an alkoxide, carboxylate, or β-diketonate or β-ketoester. However, if Pr is to be supplied in an amount which will cause phase segregation of a Pr-rich phase and a Pr-doped phase, it must not be supplied as a nitrate, halide, or oxyhalide.

The solvent is critical to the liquid feed FSP process of the present invention. Of the total solvent, preferably less than 10% by weight constitutes any non-oxygenated component such as low boiling aliphatics or aromatics such as benzene, toluene, or xylene. Most preferably, no non-oxygenated solvent is present. Use of non-oxygenated components may aid in lowering viscosity or solubilizing certain metal oxide precursors or second metal compounds. However, their presence is otherwise undesirable, since combustion is more likely to produce carbon-containing particles or carbon particles, and their solubility in many oxygenated solvents is limited.

The oxygenated solvents which are useful include alcohols, carboxylic acids, aldehydes, ketones, linear and cyclic ethers, and the like. By "oxygenated" is meant that the solvents contain chemically bound oxygen. Lower alcohols, alcohol and glycol ethers such as ethoxyethanol, methoxyethanol, and dimethoxy ethylene glycol, and tetrahydrofuran are particularly useful. Less volatile and/or more viscous oxygenated solvents such as ethylene glycol, 1,2-propanediol, 1,4-butanediol, and the like are also useful, provided that the resulting liquid feed solutions are atomizable by spraying or other aerosolization techniques. The latter oxygenated solvents are particularly useful when used in conjunction with a less viscous and more volatile solvent. In some cases, the oxygenated solvent may serve as a ligand, for example a monodentate ligand or, in the case of compounds such as ethylene glycol, triethanolamine, or 2,4-pentanedione, as a multidentate ligand. The solvent should be free of nitrogen, sulfur, and halogens, as these may result in generation of toxic gases or combustion and/or reaction products which will tend to contaminate the mixed-metal oxide product.

The mixed-metal oxide precursors and when used, any secondary metal compounds, should generally be present in the oxygenated solvent in amounts between 0.1 weight percent to about 25 weight percent. At the lower end of the concentration range, ceramic yield relative to total solution weight will be low, and product cost consequently higher. The upper end is limited by the solubilities of the metal oxide precursors and second metal compounds in the solvent, and the viscosity of the resulting solution, which must be sprayable. In certain cases, concentrations higher than 25 weight percent based on the weight of the solution may be desirable. Solutions of lower concentration tend to form mixed-metal oxide particles of smaller particle sizes.

Combustion is effected by atomizing the liquid feed into a stream of oxygen-containing combustion gas, and igniting the mixture in a closed chamber. By "closed" is meant that the combustion zone is not directly open to the surroundings. The combustion gas is preferably pure oxygen, although oxygen diluted with a non-reactive gas such as helium or argon may be used. The use of oxygen-enriched air is not desired, particularly if the nitrogen content is above 10% volume/volume. Preferably, no nitrogen is contained in the gas. Use of helium or argon may be used to lower the flame temperature while maintaining gas velocity, although this is generally not desired. In some instances, hydrogen gas may be added as a fuel to control the flame temperature.

The combustible mixture may be ignited by any convenient method, for example spark discharge, glow plug, pilot flame, etc. It is preferred that a pilot flame, i.e. of $H_2/O_2$ or methane be used. As a result of the combustion, temperatures in the range of 900° C. to 2500° C. are generally produced, preferably 1200° C. to 2200° C. In addition to dilution by inert gas and regulation of the feed stream input, external cooling may assist in maintaining the temperature desired.

Following combustion, the sub-micron particles may be collected by conventional methods, including bag filtration, electrostatic precipitation, etc. Flow of particles may be assisted by the introduction of filtered air or other gas downstream from the combustion zone where the constituents of the added gas will not react with the particles. If coatings, rather than particles, are the desired goal, the substrate to be coated may be placed proximate or somewhat downstream from the flame front, and may be heated or cooled as desired. The still hot particles impinging upon the substrate may form porous or dense coatings, which may optionally be sintered or fused. Processes and conditions for preparation of and post treatment which are suitable are disclosed in Y. Mizoguchi, M. Kagawa, Y. Syono, T. Hirai, "Film Synthesis of $Y_3Al_5O_{12}$ and $Y_3Fe_5O_{12}$ by the Spray Inductively Coupled Plasma Tecluique," J. AM. CER. SOC., 84, 651–3 (2001); F. P. Kapron, D. B. Keck, R. D. Maurer, "Radiation Losses in Glass Optical Waveguides," APPL. PHYS. LETT. 17, 423–5 (1970); J. B. MacChesney, P. B. O'Connor, F. V. Dimarcello, J. R. Simpson, P. D. Lazay, "Preparation of Low-Loss Optical Fibers Using Simultaneous Vapor Deposition and Fusion," PROC. 10TH, Internat. Congress on Glass, Kyoto, Japan; 6 40–4 (1974); Swiss Patent No. 265,192; and U.S. Pat. Nos. 2,239,551; 2,272, 342; and 2,326,059, herein incorporated by reference. However, it is believed that none of the foregoing teach the direct production of mixed-metal oxide coatings from in situ generated particles. The collected powders may also be compacted and sintered in vacuum or hydrogen atmosphere to produce low cost transparent polycrystalline ceramics, I. Shoji, S. Kurima, Y. Sato, T. Taira, A. Ikesue, K. Yoshida, "Optical Properties and Laser Characteristics of Highly $Nd^{3+}$ Doped $Y_3Al_5O_{12}$ Ceramics, APPL. PHYS. LETT. 77, 939–41 (2000); J. Lu, M. Prabhu, J. Song, C. Li, J. Xu, K. Ueda, A. A. Kaminskii, H. Yagi, T. Yanagitani, "Optical Properties and Highly Efficient Laser Oscillation of Nd:YAG Ceramics,"APPL. PHYS. B 71 469–73 (2000), herein incorporated by reference.

Aerosolization or atomization of the liquid feed can be accomplished by any suitable technique, including Bernoulli misters, cross-flow atomizers, fog misters, high pressure spray nozzles, etc. Ultrasonic misters are preferred. Such atomizers are readily available.

The liquid feed FSP device may be constructed in any suitable manner, mindful of the operating pressures involved. Reference may be had to U.S. Pat. No. 5,958,367, FIGS. 3–5, for example, where a combustion chamber of quartz is fed by a spray head supplied with liquid feed. The combustion chamber section is reduced and terminates in a quartz tube. A graded quartz/pyrex tube may be used to connect the high temperature front end to the lower temperature collection unit, in this case, an electrostatic precipitation unit with central wire electrodes and a foil or plated liner. An exit from the device may be treated to scrub gases and fine particles not collected by the precipitation unit, or may be attached to bag filters, etc. Ignition torches are located in the combustion chamber to ignite the liquid feed. A commercial high through-put unit would be expected to include cooling means rather than resort only to high temperature $SiO_2$, glass or ceramic material for the combustion chamber. A commercial coating unit may also have provision for moving a substrate into and out of the proximity of the combustion zone, so that coatings may be deposited. Such commercial devices are readily constructed by one skilled in the art.

Powders produced in the liquid feed FSP are less than 1 μm in size. Generally, the particles may be described as ultrafine, i.e. 100–500 nm, or nanosize, i.e. <100 nm, these sizes based on mean geometric particle sizes as determined by conventional methods. The particles of the subject invention are mixed-metal oxide particles in the sense that at least a portion of the particles exhibit a crystalline structure having two different metals in the crystal lattice, one of which may be a dopant metal, or a solid solution of a metal oxide in one or more metal oxides. The particles may be homogenous, or may be heterogenous, with the aforementioned mixed oxide crystalline or solid solution phases comprising domains, cores, or coatings on the particles. Thus, the particles include single phase mixed-metal particles as well as particles having two different metals in the same lattice type.

The process of the subject invention may be used to produce crystalline structures and particle structures not previously available. For example, while the subject process produces titania particles substantially identical to those produced by metal evaporation (available from Nanophase, Inc.) or flame hydrolysis (i.e. titania P25 available from Degussa), it is highly surprising that liquid feed FSP produces mixed oxide alumina-based particles, e.g. doped alumina, which consist predominantly of δ-alumina, as opposed to the forms more thermodynamically favored at FSP temperatures, i.e. α-alumina. Unlike α-alumina and γ-alumina, δ-alumina has a high surface energy, hydrated surface which renders it self-dispersing in water, a very useful property for many applications, including novel catalysts.

Furthermore, the lower density δ-alumina is such that it can accommodate doping with rare earth ions to a much higher level, i.e. 1% or 10,000 ppm, as opposed to 5–10 ppm for α-alumina. Nanosize alumina particles with doping by $Ce^{3+}$, $Nd^{3+}$, or $Pr^{3+}$ exhibit novel types of lasing activity. Such activity, R. M. Laine et al., PCT Application WO 0 0/38282 is evidence that the rare earths are doped into the lattice rather than merely on the powder surfaces. It has been found that the δ- to α-phase transformation is retarded by rare earths, in particular $Ce^{3+}$, in proportion to its initial loading in the liquid feed. The doped particles are stable to 1400° C., which is not known for δ-alumina, and the particles are further resistant to sintering. Surface areas of approximately 60 $m^2/g$ are easily attainable, and stable to 1000° C. despite the small particle size with only 1% doping. At loads greater than 1%, $CeO_2$ phase ($Ce^{4+}$) segregates from a Ce-doped alumina phase. Thus, in the first aspect of the invention, an amount of at least one second (or "further") metal oxide source is employed which introduces a quantity of this second or further metal oxide in an amount which is not stable with respect to phase segregation under the FSP conditions, such that a multiphase particle is created, a first phase consisting of one or more metal oxides, and a second phase, different from the first, consisting of one or more metal oxides. An example is the production of heterophase particles of δ-alumina and $ZrO_2/CeO_2$ solid solutions as described below.

Particles of ceria/zirconia exhibiting solid solutions have also been prepared, which exhibit surface areas of about 16 $m^2/g$ or more with no large particles evident. Attempts to synthesize similar particles using only metal nitrates produced a diverse mixture of particles including micron sized particles and hollow particles. Similar results are obtained from metal chlorides.

Use of liquid feeds containing metal oxide precursors of Al, Ce, and Zr have produced thermally stable particles consisting of δ-alumina on which a solid solution of $CeO_2$ and $ZrO_2$ segregate. The particles are stable at temperatures of 1000° C., for example showing little change in the 30 $m^2/g$ surface area over one hour. These particles exhibit high oxygen storage capacity, a property useful in automobile catalytic converters. The coating has been shown to have substantially the same oxygen storage capacity on a weight/weight basis as unsupported $(Ce_{0.7}Zr_{0.3})O_2$. Conventional catalyst materials require separate production of an alumina washcoat followed by creation of the Ce/Zr oxide coating by sol gel processing. The products produced by these properties are initially porous, but lose their porosity during aging (use). The particles produced by liquid feed FSP are not porous, and are resistant to sintering. Thus, these particles provide the promise of catalytic systems of higher efficiency which maintain their efficiency over time. The particles also exhibit $NO_x$ reducing capacity.

Applicants have unexpectedly found that: (1) In the FSP gas phase, $Al_2O_3$ is easily doped with high levels of $Ce^{3+}$ which inhibits sintering and phase transformation; (2) above these loading levels, a $CeO_2/ZrO_2$ solid solution forms on a segregated alumina phase, without being coated by the $Al_2O_3$, such that the activity remains equivalent to $CeO_2/ZrO_2$ without $Al_2O_3$. Solid solutions form and selected segregation occurs where the literature suggests that instead a complex mixture of products with almost no homogeneity should be produced. This considerable contrast offers potential for the low cost manufacture of a wide variety of materials for diverse applications, e.g. for catalysts for self-cleaning, self-disinfecting surfaces (see below) etc.

Still another important and novel observation is found for the catalytic behavior obtained from our materials. The above 16 $m^2/g$ $(Ce_{0.7}Zr_{0.3})O_2$ material has been shown to be excellent an $NO_x$ reduction catalyst, without being loaded with a noble metal catalyst! At temperatures above 450° C., conversion to $N_2$ was 99%. As such, FSP could provide considerable cost savings not only in direct synthesis costs (~$6–7M/year for U.S. automobile catalysts alone), but also in energy savings, reduced process waste, and reduced pollutant emissions.

In another application, $TiO_2$ is a well-known photooxidation catalyst generating hydroxyl or superoxide $(.OH/.O_2^-)$ radicals under illumination which can react with organic materials, oxidizing them to water soluble organics. These same chemical species are also antibacterial. Consequently there is much interest in making $TiO_2$ based coatings as self-cleaning and self-disinfecting surfaces on metals, ceramics and especially window glass.

Unfortunately, nano$TiO_2$, prepared by any method, suffers from several distinct drawbacks. First, it promotes photocatalysis only on absorbing UV light. Visible light is not effective. Hence, it can only use a small portion of the solar spectrum for photocatalysis, or requires a UV source. Second, it is poorly dispersible in many solvents, especially water. Third, it binds very poorly to organics, including bacteria, reducing its facility to be modified for dispersion or for photocatalysis. These poor attributes have spawned extensive efforts to adjust the band gap by doping so that visible light with sufficient energy (>400 nM) to generate $.OH/.O_2^-$ can be absorbed. Efforts to improve dispersibility typically involve forming coatings on the $TiO_2$ particles which also curtail photactivity. Hence, $TiO_2$ photocatalytic activity remains low, despite the launch of new products including self-cleaning surfaces (e.g. window glass). FSP derived nano$TiO_2/Al_2O_3$ materials appear to provide the requisite activity and dispersibility by using the same phenomena as discussed above, formation of mixed-metal systems that can phase segregate. They are also bacteriocides, and the alumina component can destroy chemical warfare agents.

$Al_2TiO_5$ is completely stable only above ~1400° C., below this temperature it phase segregates into $Al_2O_3$ and $TiO_2$. Thus, the opportunity exists to make nano-$TiO_2$:$Al_2O_3$ solid solutions or produce phase segregated $TiO_2$ on an α-$Al_2O_3$ phase by controlling the FSP formation temperatures and quench rate. Because the subject invention nanopowders are of high surface, phase segregation is likely to further increase the surface area of these materials offering the opportunity to further increase catalytic activity. These particles can be used in forming self-cleaning and self-disinfecting, transparent coatings.

Furthermore, all of these materials wet easily and disperse readily in water, unlike phase pure $TiO_2$ or nano-γ-alumina, e.g. from metal evaporation methods. Additionally, they provide oxidation catalysts with unique photocatalytic activity.

Recently porous, high surface area sol-gel produced titania and tin oxides doped with a variety of metals including Ce, Mn, Cr, were shown to offer excellent photocatalytic oxidation of organics using visible light (>400 nm). Unfortunately, high surface area sol-gel derived materials have many of the problems (e.g. multistep) associated with liquid phase processing as noted above. However, because liquid-feed FSP can make the same materials in one-step as high surface area non-porous, very dispersible nanopowders, and controlled surface area or dense (after flame sintering) coatings on a wide variety of surfaces, it is now possible to make such materials in one step and catalyze, for example, oxidation of organics using ordinary light. For example at >1 wt. % concentration, ceria phase segregates from δ-$Al_2O_3$, which leads to ceria doping of the titania phase in nanosegreagated $TiO_2$ on $Al_2O_3$.

In addition to serving as nanosized photocatalysts for a wide variety of photooxidation processes, nanosegregated $TiO_2/Al_2O_3$ can be used for other types of catalysis and biomedical applications. For example, photochemical development of nanosized silver on nano $TiO_2/Al_2O_3$ can be used as novel disinfecting materials and as epoxidation catalysts.

Metal acetylacetonates are very poor metal oxide precursors in alcoholic or even THF solutions because of low solubility as noted previously. However, mixing with metal proprionates such as $M(O_2CCH_2Me)_2OH$ provide solutions that completely solubilize the metal acetylacetonates providing very novel precursor solutions and in the case of YAG precursors, a completely new phase of $Y_3Al_5O_{12}$ composition. This phase provides direct access to YAG nanopowders at relatively low temperatures with unexpectedly low activation energies and with limited sintering, but these powders sinter very nicely at slightly higher temperatures, which allow formation of transparent YAG monoliths and coatings. Again by comparison, nitrates do not work well at all. But selected alkoxides and carboxylates work well to produce very fine powders, which are very important in obtaining low sintering temperatures and high transparency in films, coatings and monoliths.

In the second aspect of the invention, it is important to note that the carboxylate precursors are novel and not conventional, e.g. trifunctional metal carboxylates. The presence of the metal OH groups is thought to provide improved solubility in alcohol solvents. Furthermore, it is thought that these same compounds, $M(O_2CCH_2Me)_2OH$ and related metal carboxylates $[M(O_2CR)_xOH]$ where the alkyl group is varied for processability and low viscosity (e.g. isobutyrate, beta-hydroxy, alkoxy and keto ligands) form novel bi-, tri- and polymetallic complexes in solution that favor formation of mixed-metal oxides with complete control of stoichiometry.

By using this approach, it is also possible to control particle morphologies by using these novel precursors and pumping solutions of precursors into the flame after initial combustion to produce coated particles. It is also possible to suspend the nanoparticles themselves in alcohol because of their excellent dispersibility (OH groups on particle surfaces have an affinity for polar oxygenates) such that they can be pumped through the flame and be coated with novel and unusual phases as noted above. This includes core-shell type materials and core-shell materials with nanosegregation only within the coating.

Still another system based on yttrium doped with ytterbium and rare earths gives homogeneous nanopowders that can be used as up and down converting phosphors, as confirmed by x-ray powder diffraction patterns from materials made by LF-FSP of yttrium, ytterbium and rare earth proprionates of the type $M(O_2CEt)_2OH$. Note that when LF-FSP of these materials is performed using butanol, the trace of monoclinic phase is removed giving the pure cubic phase.

Control of compositions is also very high by this approach. For example, well defined x-ray diffraction spectra have been obtained from pure $Y_2O_3$, $(Y_{0.86}Yb_{0.08}Er_{0.06})_2O_3$, $(Y_{0.919}Yb_{0.08}TM_{0.001})_2O_3$, and $(Y_{0.949}Yb_{0.05}Pr_{0.001})_2O_3$. No other known methods provide nanopowders with control of composition. This points to the exceptional control of phase, phase and chemical composition possible with the precursor systems invented in the present invention.

Synthesis of yttrium-aluminum garnet oxide $(Y_3Al_5O_{12})$ nanopowders by liquid-feed flame spray pyrolysis (LF-FSP) of combinations of yttrium and aluminum precursors dissolved in ethanol, butanol and/or THF has been achieved. These include solutions of yttrium 2-ethylhexanoate and alumatrane $[N(CH_2CH_2O)_3Al]$ in THF or ethanol; yttrium methoxyacetate and alumatrane in ethanol; yttrium acetylacetonate and alumatrane in ethanol, and yttrium propionate and aluminum acetylacetonate, in ethanol or THF. Each precursor system was aerosolized using oxygen and coincidentally ignited. The powders obtained were collected by electrostatic precipitation at rates of 50 g/h.

Surprisingly, the choice of precursor strongly influences both the initial phase composition and morphology of the YAG FSP powder, as well as the phase changes that occur during annealing. As-collected FSP nanopowders (~100 nm ave. particle size) had the YAG composition of the precursor feed; however XRD suggests a mixed composition of $YAlO_3$ (YAP) and $Y_4Al_2O_9$ (YAM) structures. The remaining alumina was thought to be present in defect structures or as nanosegregated material; however the more homogeneous powders exhibit FTIR, TEM and XRD data that suggest a new phase with a perovskite crystal structure and a YAG composition. Annealing studies demonstrated that at temperatures <1000° C. (7–10 d) these powders transform to the YAG $(Y_3Al_5O_{12})$ phase without coincident grain growth or particle necking to free-flowing YAG phase powders. The activation energy for this phase transition was found to be 100 kJ/mol, much lower than most reported values.

YAG $(Y_3Al_5O_{12})$ materials in various forms have proven useful for many diverse applications. For example, $Ce^{3+}$ doped YAG is a phosphor used for fast response scanners. YAG phosphors have also been well studied because of their stability under electron beam irradiation. YAG single crystals grown from the melt are used for laser applications. Polycrystalline YAG exhibits extremely low creep, and melts at ~1900° C., making it an excellent material for high temperature structural applications.

YAG nanopowders offer the potential to carefully control the final grain structure in dense polycrystalline YAG used for structural applications, while nanosized spherical particles offer potential for higher definition and brightness in phosphor applications. Sintered micron and nanosized YAG powders have been used to make high efficiency, transparent, polycrystalline YAG lasers as well. In addition, a wide variety of nanopowders are reported to exhibit lasing properties that differ from micron-sized powders: an emission behavior explained by Anderson localization of light and now reported by several groups. Hence there is significant motivation to develop methods of preparing large-scale quantities of high quality YAG nanopowders.

Many techniques have been used to synthesize YAG nanopowders including coprecipitation, gel entrapment, and spray pyrolysis. Although YAG is the thermodynamically stable phase; kinetically favored phases [e.g., hexagonal (YAH) or orthorhombic (YAP) $YAlO_3$ and $Y_4Al_2O_9$ (YAM)] often form first in these processes. For example, YAH and YAP are the common kinetic phases formed using gas phase synthesis techniques. Nyman et al., "Comparison of Solid-state and Spray-pyrolysis Synthesis of Yttrium Aluminate Powders," J. AM. CER. SOC. 80[5] 1231–38 (1997), studied the influence of precursor on the formation of YAG during spray pyrolysis, concluding that short reaction times prevent the formation of the YAG phase (Nyman et al. obtained $Y_2O_3$ and YAH). In earlier work, LF-FSP of metalloorganics was used to produce YAG composition $(YAP/Al_2O_3)$ nanopowders. However, efforts to transform these $YAP/Al_2O_3$ nanopowders to pure YAG phase by heating led to extensive particle necking followed by excessive grain growth.

As can be seen from the above, the particles produced according to the various aspects of the invention exhibit properties not previously found in nanoparticles produced using other methods, or even by FSP using different precursors. The inventive particles have a wide variety of uses, including high levels of catalytic activity, and the ability to provide tailored ceramic materials of high strength and toughness.

Having generally described this invention, a further understanding can be obtained by reference to certain specific Examples which are provided herein for purposes of illustration only and are not intended to be limiting unless otherwise specified.

EXAMPLES 1–9

Precursor Preparations

Example 1

Yttrium Propionate by Precipitation

The preparation of yttrium proprionate solutions begins with the conversion of the individual commercial nitrates to hydroxide hydrates. Approximately 10–15 wt % of the yttrium nitrate hexahydrate was dissolved in deionized water and filtered. Next, concentrated ammonium hydroxide was added to the stirring nitrate solution, causing immediate precipitation of the metal hydroxide hydrate. Addition of the base was continued until the pH of the slurry was ≈8, signaling complete precipitation of the yttrium cations. The precipitate was collected with pressure filtration and washed 4× with deionized water. The solid was allowed to air dry over 1–3 days, ground to a powder, and stored in containers under ambient atmosphere. The ceramic yields of the hydroxide hydrate was determined by measuring the mass loss of several samples after heating to 1100° C. at 20° C./min with a 0.5 h isotherm.

The hydroxide hydrate prepared above was then used in the preparation of the proprionate solutions. The exact amount of hydroxide hydrate used varies with the ceramic yields (i.e., the exact amount of residual water) from batch to batch, but a sufficient amount is used to provide a solution with a 3 wt % yield of yttrium oxide upon pyrolysis. A typical procedure begins with heating 260 mL of proprionic acid with stirring in a 2 L beaker on a hot plate. When the acid is just hot enough to boil, the calculated amount of hydroxide hydrate is added gradually. The addition of the solid to the hot acid is accompanied by vigorous boiling as water vapor is released as a byproduct of the formation of the soluble yttrium propionate salt. After complete dissolution of the solid, 1350 mL of denatured ethanol is added, resulting in a clear, pale yellow solution. Byproduct water can be removed by distillation if necessary. Typically, the yttrium proprionate solution is used immediately; however, it can be stored in a closed container for later use, but a small amount of yttrium proprionate crystals may form upon standing. These can be redissolved by heating the solution to reflux.

Example 2

Rare Earth Proprionates

Many rare earth elements can be converted from their nitrate to hydroxide hydrate, which then allows for their easy dissolution in excess proprionic acid, thereby forming the proprionate salts. The procedure for both is identical to that described above for yttrium. The specific elements that have been used successfully are lanthanum, neodymium, gadolinium, terbium, erbium, thulium, ytterbium, and lutetium.

One exception to these procedures is cerium. When attempting to precipitate a cerium hydroxide hydrate from an aqueous solution of cerium nitrate, large amounts of $CeO_2$ are produced which cannot be redissolved in proprionic acid. This is a unique aspect of Ce chemistry, which has not been a problem for the other rare earths used in this procedure. The formation of a cerium proprionate has been achieved by a separate procedure described below.

Example 3

Cerium Proprionate

A typical procedure begins with heating 1250 mL of proprionic acid with stirring in a 2 L beaker on a hot plate. When the acid is just hot enough to boil, 400 g of $Ce_2(CO_3)_3 \cdot xH_2O$ is added gradually. The addition of the solid to the hot acid is accompanied by vigorous boiling as water vapor is released as a byproduct of the formation of the soluble cerium proprionate salt. After the solid has been completely added, the mixture is allowed to heat for 20 min. further, and 250 mL of deionized water is added. At this point, the mixture is a yellow solution made opaque by the presence of undissolved solid. The mixture is removed from the hot plate, and the solid is allowed to settle overnight. The solution is carefully decanted from the solid and simultaneously gravity filtered through a piece of commercial paper towel to removed residual particles floating in the liquid. The actual amount of cerium present in the resulting solution is determined by measuring the mass loss of several samples after heating to 1100° C. at 20° C./min with a 0.5 h isotherm. Depending on the amount of $Ce_2(CO_3)_3 \cdot xH_2O$ dissolved, ceramic yields of ~10 wt % $CeO_2$ are typical. This stock solution can be stored indefinitely in a closed container with no noticeable precipitation of cerium proprionate. For FSP, 250 mL of the stock solution is diluted with 150 mL of proprionic acid and 800 mL ethanol; this dilution should be used immediately as the cerium proprionate will begin to precipitate after several hours.

Example 4

Barium Proprionate

Barium proprionate can be readily formed by the neutralization reaction between $Ba(OH)_2 \cdot 8H_2O$ and proprionic acid. The salt is only modestly soluble in ethanol but is much more soluble in ethylene glycol. A typical procedure begins by mixing 250 g $Ba(OH)_2 \cdot 8H_2O$, 250 mL proprionic acid, and 500 mL ethylene glycol in a 2 L round bottom flask. The flask is connected to distillation condensers and heated to boiling with a Variac™ controlled heating mantle. As the mixture warms, the $Ba(OH)_2 \cdot 8H_2O$ slowly dissolves and finally become clear once boiling starts. Heating is continued to remove byproduct water, and excess propionic acid and ethylene glycol are removed by distillation. Once the temperature of the evolving vapors has reached >160° C., the distillation is stopped, and the solution is allowed to cool. The solution at this point is clear and yellow. For pyrolysis, a solution which is approximately 5 wt % BaO can be prepared by diluting the entire volume of Ba proprionate solution above with 2 L ethanol.

Example 5

Zirconium Proprionate

Basic zirconium carbonate ($2ZrO_2 \cdot CO_2 \cdot xH_2O$) easily reacts with proprionic acid, and the resulting proprionate salt is readily soluble in ethanol. A typical small-scale procedure begins by heating 100 mL proprionic acid in a 2 L beaker until the solvent is boiling. Next, enough $2ZrO_2CO_2 \cdot xH_2O$ is added to yield 20 g of $ZrO_2$. The solid is added gradually because its dissolution is accompanied by vigorous release of $H_2O$ and $CO_2$. The final solution is ≈2 wt % $ZrO_2$.

Example 6

Magnesium Proprionate

In a 2 L beaker, 1750 mL of proprionic acid was heated to a gentle boil while stirring on a hot plate. 150 g of $Mg(OH)_2$ was added gradually because the dissolution of the hydroxide is accompanied by a vigorous evolution of byproduct water vapor. The solution is vacuum filtered, and the glassware and filter apparatus are rinsed with a total of 1500 mL ethanol, which is combined with the Mg/proprionate solution. The combined solution has a yield of ~2 wt % MgO and can be stored for several days in a closed container at room temperature.

Example 7

Alumatrane LF-FSP Precursor

A 2.6 L EtOH solution was made by mixing alumatrane made by mixing stoichiometric amounts of triethanolamine with a commercial aluminum alkoxide, e.g. tris(s-butoxy)Al in ethanol such that the TGA ceramic yield is 12 wt%.

Example 8

Yttrium Methoxyacetate

Anhydrous $YCl_3$ (25.0 g, 0.0825 mole) was introduced to a 250 mL flask equipped with a magnetic stir bar and reflux condenser under $N_2$. Methoxyacetic acid ($CH_3COCH_2CO_2H$, 50 mL, 0.65 mole) was then added with a syringe. The solution was then heated for 2 h at 135° C. during which time byproduct HCl (g) was vented to a hood. After reaction was complete (~2 h), the solution was cooled, filtered and additional methoxyacetic acid added to produce a 50 mL solution with a TGA ceramic yield of 37 wt %. Adventitious water was assumed to cause formation of $Y(OH)(O_2CCH_2OMe)_2$.

Example 9

Yttrium (Hydroxy) Proprionate $Y(NO_3)_3 \cdot 6H_2O$ powder (50.0 g, 0.1306 mole) was placed in a 500 mL flask equipped with a still head, addition funnel, under a flow of $N_2$ injected directly in the liquid via a glass tube. The still head is itself connected to another still head connected at 120° angle. Water and proprionic acid distilled is collected in a 250 ml flask connected to a 700 ml water bubbler. Proprionic acid (250 mL, 3.40 moles) was added rapidly and the resulting solution heated at 120° C./4 h to distill off ~150 mL of liquid (water/proprionic acid) and release $NO_x$ gas. A pH-meter probe was placed in the water bubbler to detect this release: the pH in the bubbler decreased from 8 to 3.5 during the reaction. The solution is then cooled for one hour, under a $N_2$ flow. The solution is then tested by adding 0.5 ml of the solution to 25 mL of ethanol and 1 gram of aluminum acetylacetonate (insoluble in ethanol): yttrium propionate complexes with the aluminum acetylacetonate, and the solution becomes clear after 5 sec of manual stirring.

Yttrium propionate was prepared from yttrium nitrate using the method described above. The resulting product can be precipitated from reaction solutions as a white powder upon addition of THF. Following vacuum drying, FTIR of the dry powder shows a strong n-OH peak at 3370 cm$^{-1}$. Two broad peaks observed at 1500 and 1290 cm$^{-1}$ correspond to nC-O bands of bound carboxylate groups. The FTIR suggests the presence of at least one hydroxyl group on the yttrium.

$_1$H NMR studies confirm the presence of the proprionate groups but no OH proton, which is expected because of rapid exchange with the deuterated solvent. Surprisingly, $^1$H NMR reveals the presence of THF solvent molecules in an ~2:3 THF:yttrium proprionate ratio. This ratio was constant in four different batches of the powder. The presence of THF solvate is further supported by the TGA results.

TGA studies were conducted to identify the decomposition pattern for comparison with our previous work. In the TGA, a mass loss of ~16 wt % is observed beginning at ~100° C. (10° C./min ramp rate/air) and is assumed to be loss of THF of crystallization. After loss of the solvate molecules, a further mass loss is observed (~175° C.) of 39 wt %. If the solvent loss is ignored, then the actual ceramic yield at this point is 53.2%. On further heating, a slower mass loss of 17 wt % is observed that appears to continue to ≈700° C. The final ceramic yield, disregarding solvent loss is 43.7 wt %.

Based on the FTIR data and the ceramic yield data, $Y(O_2CEt)_2OH$, appears to be the correct structure of this product. Further support for this model comes from the following.

If the precursor is $Y(O_2CEt)_2OH$ (F.W.=252.006) and THF is present in a 2:3 ratio, then it is possible to calculate that the expected solvent loss will be 16.1 wt %, exactly what is observed. The 175° C. mass loss likely arises from thermal fragmentation of the carboxylates with loss of ketene:

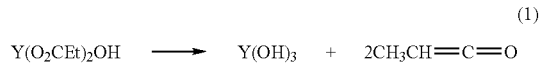

(1)

$$Y(O_2CEt)_2OH \longrightarrow Y(OH)_3 + 2CH_3CH=C=O$$

The expected mass loss is then 43.7 wt % which is exactly that found. The final ~17.0 wt % mass loss can be attributed to loss of the hydroxyl groups, which is calculated to be 19%.

The precursors listed in Table 1, were combusted under very similar conditions. Typically, 43 wt % (37.5 mol %) alumina as precursor and 57 wt % (62.5 mol %) yttria as precursor were dissolved in the chosen solvent and aerosolized at rates that led to production of ~50 g/h of powder. The pressure in the aerosol generator was kept at 20 psi. Two methane torches were used to ignite the aerosol. Examples 10 and 11 are Comparative Examples.

Examples 10–16

TABLE 1

| Example | Y Source | Al Source | Solvent | Ceramic Yield (wt %) |
|---|---|---|---|---|
| 10 | $Y(NO_3)_3 \cdot 6H2O$ | $Al(NO_3)_3 \cdot 9H2O$ | EtOH | 2.5 |
| 11 | $Y(NO_3)_3 \cdot 6H2O$ | $Al(NO_3)_3 \cdot 9H2O$ | BuOH | 5 |
| 12 | $Y(O_2CCH_2OCH_3)OH$ | $N(CH_2CH_2 9)_3Al$ | EtOH | 5 |
| 13 | $Y(O_2CCHEtC_4H_9)_3$ poorly soluble | $N(CH_2CH_2 9)_3Al$ | THF/EtOH 90/10 | 2.5 |
| 14 | $Y(O_2CCH_2OCH_3)OH$ | $N(CH_2CH_2O)_3Al$ | EtOH + $H_2O$ 3 mol % | 5 |
| 15 | $Y(O_2CEt)_2OH$ | $Al(Acac)_3$ | EtOH | 2.5 |
| 16 | $Y(O_2CEt)_2OH$ | $Al(Acac)_3$ | THF | 2.5 |

Although most of the precursor systems remain soluble for indefinite periods of time, the precursor of Example 16 was difficult to work with because of the poor solubility of Al(acac)$_3$ in THF, leading to off-stoichiometries. A further sample (Example 17) was prepared using precursor 15 and by increasing the flow speed (as well as improving the regularity of the flow) in the process.

The precursors in Examples 14–16 provide the best YAG materials, whereas the other precursors of Examples 12–13 are not quite so good in this respect. However, the precursors in Examples 10 and 11 (Comparative) produced powders with a wide range of particle sizes, including large particles, which also exhibit very different structure by XRD and other analytical techniques. Furthermore, the nanopowders from precursors 14–16 all show a heretofore unknown phase that has perovskite crystal structure with a $Y_3Al_5O_{12}$ composition that readily transforms to the YAG phase crystal structure at very low activation energies and forms YAG nanopowders without sintering. Yet this same powder will sinter to >98% density at 1500° C.

Given that the DTA exotherms for YAG conversion (1100°–1400° C.) occur at temperatures where necking and sintering are anticipated to occur, and based on annealing studies of nano-mullite powders, the use of annealing to promote phase transformation at 800°–900° C. was explored with the goal of converting the powders to the YAG phase in a reasonable amount of time, without necking. The activation energy ($E_a$) for phase conversion was determined using methods similar to those of Baranwal et al., "Flame Spray Pyrolysis of Precursors as a Route to Nanomullite Powder . . . ," J. AM. CER. SOC. 84[5[, 951–61 (2001), and Johnson et al., "Crystallization Kinetics of Yttrium Aluminum Garnet," J. MATR. RES., 16 [6], 1795–1805 (2001).

The fraction of material converted to the YAG phase follows the Avrami equation:

$$YAG\% = 1 - e^{-Kt_n}$$

where "n" depends on whether the transformation is interface or diffusion controlled. The constant K depends on the activation energy:

$$K = K_0 \times e^{\frac{E_a}{R(T-T_0)}}$$

$E_a$ was calculated in Table 2 from the shift of the YAG exotherm in the DTA ($\Delta T$) with changes in heating rate ($\Delta$ rate):

$$E_a = R \times \Delta T \times \frac{\ln(\Delta T)}{\ln(\Delta rate)}$$

TABLE 2

YAG starting formation temperature and $E_a$.*

| | Precursor | | | | | | | |
|---|---|---|---|---|---|---|---|---|
| | 10 | 11 | 12 | 13 | 14 | 15 | 16 | 17 |
| YAG formation (° C.) | 1280 | 1270 | 1060 | 1050 | 960 | 1100 | 1110 | 1100 |
| $E_a$ (kJ/mol) | 210 | 208 | 210 | 280 | 86 | 106 | 166 | 100 |

*The formation starting temperature was obtained at a heating rate of 10° C./min.

These activation energies provided a reasonable basis for defining the annealing studies and for choice of the optimum precursor. According to the activation energy calculations, complete conversion to the YAG phase should occur after annealing at 850° C. for 10 days with Sample 15. Complete conversion to YAG (100% YAG crystalline phase as observed in XRD) was confirmed after annealing at 850° C. for 10 days. This temperature is much lower than the usual temperature for YAG formation, and allows conversion without necking or particle growth (SSA remains unchanged at 39 and 79 m$^2$/g for Samples 15 and 17 respectively and SEM shows no necking).

Example 18

Rare Earth Doped YAG Phase

The process of Example 15 is repeated, except that from about 1 to 20 atom percent rare earth dopants are added as the proprionate or isobutyrate and produce homogeneously doped materials that crystallize to YAG phase on appropriate heat treatment with the dopant retained in the crystal structure.

Example 19

Ce/Zr/Al/O

A stock solution of $Al^{3+}$ complexed with triethanolamine (TEA) is prepared first. 5547 g of TEA is mixed with 2775 mL of ethanol, and 9138 g of Al(sec-butoxide)$_3$ is added gradually to avoid the evolution of excessive heat from the alcohol exchange reaction. After the addition is complete, the reagents are thoroughly mixed, and a small amount of precipitate is removed by filtration of the solution. The actual $Al_2O_3$ concentration is determined by gravimetric analysis of three samples in alumina crucibles fired to 1100° C. for 30 min in air. Ceramic yields of such solutions range from 9–11 wt % $Al_2O_3$.

A precursor solution for a ceramic 20 wt % $Ce_{0.7}Zr_{0.3}O_2$: 80 wt % $Al_2O_3$ was prepared using the stock solution above and the acetylacetonate (acac) salts of $Ce^{3+}$ and $Zr^{4+}$. 4.644 g of Zr(acac)$_4$ was dissolved in 200 mL ethanol, and 200 mL of an Al-TEA stock solution (ceramic yield: 10.19 wt %) was added, yielding a clear yellow solution. Ce(acac)$_3$ is much less soluble than Zr(acac)$_4$; 1400 mL of ethanol was needed to dissolve the stoichiometric amount (9.726 g) of Ce(acac)$_3$ required, and even then a trace amount of the reagent remained undissolved. Once the two solutions were combined, a modest amount of turbidity formed. Heating the solution to reflux did not dissolve the fine precipitate responsible for the turbidity, and so the procedure continued with the turbid solution. The combined solution was mixed with an equal volume of ethanol (1750 mL for each), and FSP was performed under standard conditions.

Example 20

Ti/Al/O

Stock solutions of TEAAl (prepared as above) are readily miscible with Ti(TEA)isopropoxide, prepared as an 80 wt % solution in 2-propanol by Ti(TEA)isopropoxide with an average ceramic yield of 13.7 wt % $TiO_2$. This accesses precursor solutions for Ti/Al oxides whereby the composition is controlled by the relative amounts of the two stock solutions. For example, a 2 wt % precursor solution for 13 wt % $TiO_2$:87 wt % $Al_2O_3$ was prepared by mixing 3466 mL of Al-TEA solution (9.25 wt % $Al_2O_3$) with 328 mL Ti(TEA) isopropoxide and 14206 mL ethanol, yielding a clear, yellow solution. LF-FSP was performed under standard conditions.

Example 21

Y, Yb, Er Propionates for Up-converting Phosphors

The preparation of rare earth propionate solutions for LF-FSP of upconverting powders begins with the conversion of the individual commercial nitrates to hydroxide hydrates. Approximately 10–15 wt % of the nitrate salts are dissolved in deionized water and filtered. Next, concentrated ammonium hydroxide is added to the stirring nitrate solution, causing immediate precipitation of the metal hydroxide hydrate. Addition of the base is continued until the pH of the slurry is ~8, signaling complete precipitation of the rare earth cations. The precipitate was collected with pressure filtration and washed 4× with deionized water. The solid was allowed to air dry over 1–3 days, ground to a powder, and stored in containers under ambient atmosphere. The ceramic yields of the hydroxide hydrate are determined by measuring the mass loss of several samples after heating to 1100° C. at 20° C./min with a 0.5 h isotherm.

The hydroxide hydrates prepared above are then used in the preparation of the propionate solutions. The exact amount of hydroxide hydrate used varies with the ceramic yields (i.e., the exact amount of residual water) from batch to batch, but enough of it is used to give a solution with a 3 wt % yield of yttrium oxide upon pyrolysis. A typical procedure begins with the heating 260 mL of proprionic acid with stirring in a 2 L beaker on a hot plate. When the acid is just hot enough to boil, the calculated amount of each hydroxide hydrate is added gradually. For example, to prepare an oxide at this scale with the composition $(Y_{0.86}Yb_{0.11}Er_{0.03})_2O_3$ requires 62.88 g of Y hydroxide (ceramic yield=62.01%), 13.90 g Yb hydroxide (ceramic yield=62.61%), and 3.13 g of Er hydroxide (ceramic yield=73.52%). The addition of the solid to the hot acid is accompanied by vigorous boiling as water vapor is released as a byproduct of the formation of the propionate complexes. After complete dissolution of the solid, 1350 mL of ethanol is added, resulting in a clear, pale yellow solution. The use of nitrates alone results in large particles up to 1 μm in the FSP process.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the preparation of mixed-metal oxide particles, comprising combusting a liquid feed stream comprising two or more metal oxide source compounds dissolved in an oxygen group-containing combustible solvent, and aerosolized by atomization with an oxygen-containing gas to form a combustible liquid aerosol, followed by direct ignition and combustion of said solvent and flame pyrolysis of said metal oxide source compounds wherein
   a) said two or more metal oxide source compounds include
      a)i) at least one first metal oxide source compound which is a first metal alkoxide, first metal carboxylate, or mixture thereof;
      a)ii) at least one second metal source compound which is a second metal alkoxide, second metal carboxylate, or mixture thereof;
      a)iii) optionally one or more further metal oxide source compound(s) which are further metal alkoxides, further metal carboxylates, or mixtures thereof; and
      a)iv) optionally a dopant metal compound, said dopant metal compound comprising a dopant metal metalloorganic compound, or, in the case where the dopant metal concentration is insufficient to cause phase segregation in said mixed-metal oxide particles, a dopant metal halide, a dopant metal oxyhalide, or a dopant metal nitrate,
   wherein upon pyrolysis, phase segregation into at least two compositionally different phases occurs, at least one phase being a homogenous phase comprising two different metal oxides; or
   b) said two or more metal oxide source compounds include
      b)i) at least one first metal oxide source compound which comprises a metal carboxylate of the formula $$M(OH)_n(OC(O)-R)_m \qquad (I)$$

where M is said first metal, n is at least 1, m is at least 1, and OC(O)—R is a carboxylate group derived from an organic carboxylic acid, where the sum of n and m equal the valence of metal M;
      b)ii) optionally a second metal oxide precursor compound which is a second metal alkoxide, a second metal carboxylate, or mixture thereof;
   wherein at least two different metals are present from the metal oxide source compounds b)i) and b)ii); or
   c) said two or more metal oxide source compounds include
      c)i) at least one first metal carboxylate, and
      c)ii) at least one second metal source compound which in said oxygenated solvent is insoluble in the concentration desired to be used, but is soluble in the concentration desired to be used when in the presence of a first metal carboxylate,
   said oxygen gas-containing stream optionally further comprising hydrogen gas, and collecting a pulverulent product having a mean particle size of less than 1 μm.

2. The process of claim 1, wherein the metal of at least one of said two or more metal oxides is aluminum or titanium.

3. The process of claim 1, wherein said at least one first metal carboxylate c)i) is an oxygen group-containing combustible solvent soluble $C_{1-6}$ carboxylate of said first metal; and said second metal source compound is a second metal carboxylate having a carboxylate group containing more than 6 carbon atoms, a second metal β-diketonate or B-ketoester, or mixtures thereof.

4. The process of claim 1, wherein a first metal oxide source compound b)i) comprises a first metal carboxylate of the formula I wherein the carboxylate group OC(O)—R is a $C_{3-6}$ carboxylate group, and said first metal is selected from the group consisting of aluminum, titanium, and zirconium, and the metal of a second metal alkoxide or a second metal carboxylate is selected from the group consisting of aluminum, titanium, and zirconium, said second metal different from said first metal.

5. The process of claim 1, wherein the metal of one of said first metal oxide source compound a)i) or said second metal oxide source compound a)ii) comprises aluminum, and said metal oxide particles comprise an optionally doped δ-alumina core and an outer phase comprising two or more metal oxides.

6. The process of claim 4 wherein said solvent comprises one or more solvents selected from the group consisting of methanol, ethanol, 1-propanol, 2-propanol, 1-butanol, 2-butanol, methyl ethyl ether, diethyl-ether, glyme, ethylene glycol, methyl ethyl ketone, and tetrahydrofuran.

7. The process of claim 1, wherein the metal of one metal oxide source compound is aluminum, and said particles comprise a core of δ-alumina and a shell of mixed-metal oxides, a metal of one metal oxide in said shell being a rare earth metal.

8. Sub-micron particles comprising a core of optionally doped δ-alumina and at least a partial shell surrounding said core, said at least partial shell containing a $ZrO_2/CeO_2$ phase, prepared by the process of claim 1.

9. Sub-micron particles comprising δ-alumina doped with a rare earth metal in an amount up to 10,000 ppm of at least one rare earth metal relative to the total weight of said particles, prepared by the process of claim 1.

10. Particles comprising δ-alumina and titania; and a rare earth metal oxide in an amount greater than 1 weight percent based on the total weight of the particles, said particles comprising an alumina phase and a segregated titania phase doped with ceria, cobalt, platinum, vanadium, rhodium, or other metal that lowers the bandgap necessary to absorb light and do photocatalysis, said particles prepared by the process of claim 1.

11. Particles having the overall composition of a yttrium aluminum garnet, prepared by the process of claim 1, and having a perovskite phase, said particles sinterable to yttrium aluminum garnet particles without necking by annealing at 800° C. to below a temperature of about 1100° C. where necking and sintering occur.

12. A process for the preparation of a coating of a mixed-metal oxide on a substrate, comprising impinging onto said substrate a stream of mixed-metal oxide particles prepared by the process of claim 1 without first isolating said mixed-metal oxide particles.

13. The process of claim 12, further comprising sintering said coating of mixed-metal oxides to form a densified coating.

14. A transparent ceramic material made by forming green-body comprising compacted mixed-metal oxide nanoparticles prepared by the process of claim 1 and sintering to full density at low temperatures to transparency.

15. Sub-micron particles comprising at least one metal oxide selected from the group consisting of alumina, silica, titania, and zirconia, and at least one further oxide of a transition metal, lanthanide metal, or actinide metal and prepared by the process of claim 1, wherein said particles contain at least two distinct phases.

16. Sub-micron YAG particles prepared by oxidizing a liquid feed stream containing an aluminum oxide source compound and a yttrium oxide source compound by the process of claim 1 to produce particles having a perovskite phase and a $Y_3Al_5O_{12}$ composition, and annealing at a temperature below that at which sintering and necking occur to form said YAG nanoparticles.

17. The use of the sub-micron YAG particles of claim 16 to form a YAG ceramic article by sintering at a temperature at which sintering occurs, or a YAG coating on a substrate by producing YAG nanoparticles in situ, coating a substrate with said nanoparticles, and annealing to produce a dense YAG coating.

* * * * *

UNITED STATES PATENT AND TRADEMARK OFFICE
CERTIFICATE OF CORRECTION

PATENT NO. : 7,220,398 B2
APPLICATION NO. : 10/503454
DATED : May 22, 2007
INVENTOR(S) : Anthony C. Sutorik et al.

It is certified that error appears in the above-identified patent and that said Letters Patent is hereby corrected as shown below:

Column 17, line 29 replace "YAG% = 1 − $e^{-Ktn}$" with -- YAG% = 1 − $e^{-Kx1n}$ --

Signed and Sealed this

Seventh Day of August, 2007

JON W. DUDAS
*Director of the United States Patent and Trademark Office*